July 19, 1932. W. E. TRENT 1,867,783
CONTINUOUS PROCESS OF PURIFYING MATERIALS
Filed July 7, 1927
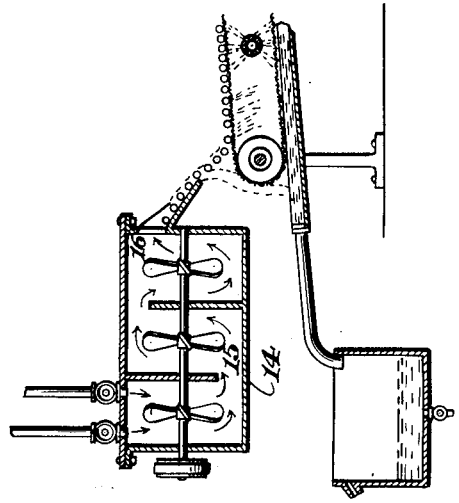
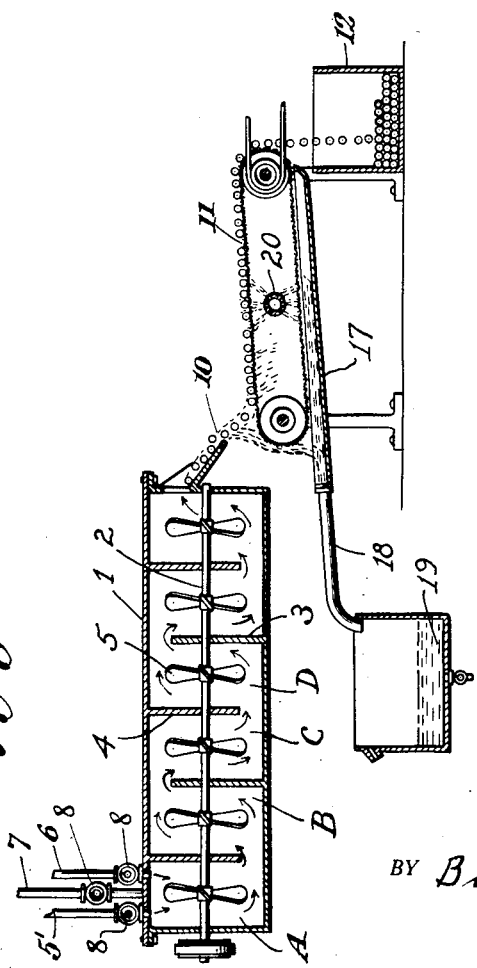
INVENTOR.
Walter E. Trent
BY Baim & Thomas
ATTORNEY.

Patented July 19, 1932

1,867,783

UNITED STATES PATENT OFFICE

WALTER EDWIN TRENT, OF NEW YORK, N. Y., ASSIGNOR TO THE TRENT PROCESS CORPORATION, A CORPORATION OF DELAWARE

CONTINUOUS PROCESS OF PURIFYING MATERIALS

Application filed July 7, 1927. Serial No. 204,069.

The invention relates to improvements in a process for purifying and agglomerating finely divided carbonaceous fuel particles.

It is an object of the invention to provide a process wherein the carbonaceous content of such fuels as coals may be continuously agglomerated with an agent such as a hydrocarbon oil into bodies of predetermined or controlled sizes, and from which bodies foreign substances such as ash-forming impurities and water are substantially eliminated.

This application is a continuation in part of my prior application, Serial No. 486,260, filed July 20, 1921.

In my Patent No. 1,420,164, I have disclosed a broad process of separating the carbonaceous content of coal from noncarbonaceous matter. In such process the coal is first reduced to a fine state of subdivision, and while wet is commingled with an oil having an affinity for the carbon and forming therewith a plastic mass of carbon and oil rejecting water and ash-forming impurities. In the process described in this patent, a large coherent mass of carbon and oil, or a plurality of masses of such size as not to be readily carried by flowing water, deposits in the amalgamating chamber, this necessitating a discontinuance of the operation at frequent intervals in order that the amalgamated mass or masses may be removed from the amalgamator. Such an operation may be appropriately termed an "intermittent" one, the time consumed in removing the finished product serving to materially impair the capacity of a treating plant.

I have discovered that amalgamated bodies of carbon and oil of predetermined sizes may be continuously formed in a treating vessel and discharged therefrom without substantial enlargement in suspension in a flowing body of water if certain variable conditions of operation are under proper control. The amalgamated bodies formed by the process each consists of a vast multitude of carbon particles in compact formation with the hydrocarbon oil representing dense bodies from which water and ash-forming impurities are substantially excluded. To carry out a continuous operation, it is imperative that the conditions under which the operation is performed be in the control of an operator whereby such bodies may reach a predetermined size and be thereafter maintained against undue enlargement so that they will be carried in suspension in the flowing body of water from the amalgamating vessel. Any undue enlargement will result in the deposition of the bodies in the bottom of the amalgamator where they will progressively accumulate and rapidly fill the amalgamator, at which time the operation must be discontinued for the removal of such substances.

I have discovered that by controlling the agitation, the water dilution and the temperature of the materials being treated that the sizes of the amalgamated bodies to be produced may be predetermined and such bodies maintained throughout a continuous operation in substantially uniform predetermined sizes. This enables the production of amalgamated bodies that are sufficiently small to continuously flow from the amalgamator in water suspension. If during an operation it is found that the bodies are increasing in size, a reduction in the temperature of the bath and an increase in the water dilution without disturbing the rate of agitation will result in the production of normal sized bodies. By controlling these conditions of operation, I am enabled to produce continuously amalgamated bodies of a substantially uniform size. I have further found that by subjecting the bodies to a proper rate of agitation, an undue growth of the bodies is materially prevented as the agitation due to friction, attrition and perhaps other factors seems to wipe off surplus material from such bodies in the form of particles or groups of particles united by oil that thereafter serve as nuclei for the formation of further bodies. It is to be understood that amalgamated bodies or masses are constantly carried in the amalgamator in a flowing stream of water passing therethrough and are separated from such water after discharge from the amalgamator.

My invention further contemplates the process wherein the amalgamation of the fine coal particles in the oil occurs in successive compartments, a substantial portion of the amalgamated bodies being formed in one compartment and thereafter carried in water suspension successively through the succeeding compartments without substantial growth in size, while the carbon particles and oil remaining in an unamalgamated state continue to agglomerate while passing through the succeeding compartments so that at the time the exit of the amalgamator is reached substantially all of the carbon and oil have agglomerated in amalgamated bodies of a predetermined size and are discharged from the amalgamator in the flowing stream of water from which they are later separated in any approved manner.

The present invention constitutes a further improvement upon my earlier patents above-mentioned in that I have found that the agglomerates or amalgamated masses after they have been removed from the agitator and separated from the ash-forming impurities and water may be further treated to form larger masses of sizes approaching those of briquettes, so that these masses may be baked directly without molding or briquetting to form hard or solid fuel bodies. This further treatment consists in repetition of the agitation treatment in a body of clean, preferably cold, water, for such time and with such a degree of agitation as to cause the amalgamated masses or agglomerates to coalesce to the desired extent.

In carrying out my process I utilize but a single amalgamating substance to form the dense bodies of coal and oil. Such substance may consist of any hydrocarbon oil, such for instance, as fuel oil. To form these dense masses or bodies, I have found that the quantity of oil used should exceed fourteen percent (14%), and that in commercial operations the quantity of oil generally will represent at least fifteen percent (15%) of the coal treated. The relative proportions of the hydrocarbon oil and coal will, however, vary considerably depending upon the character of the oil and the fineness of coal being treated. For example, as high a proportion of fuel oil as one part by weight to two parts by weight of the carbonaceous content of the coal undergoing treatment may be used. By employing a quantity of oil within the range above indicated, and with a rapid and proper rate of agitation, individual dense masses will be formed of substantially uniform size. These masses will be sufficiently small and dense and of such individual character that they will be carried in suspension in the flowing stream of water from the amalgamator. On the other hand, if a slow rate of agitation is employed, even when using this quantity of oil, a coherent pasty agglomerated mass of amalgam will be formed which will deposit in the bottom of the amalgamator and interrupt the operation.

In the process herein described, the bodies formed in the amalgamator may vary in size, but excellent results have been obtained in treatments where such bodies are substantially one-fourth inch (¼″) in diameter. It will be appreciated, however, that by controlling the intense agitation, the water dilution and the temperature of the bath, the sizes of such bodies may be materially varied.

It frequently is desirable to enlarge the bodies after they are discharged from the amalgamator, and I have found that if such bodies after being separated from the original purifying water which contains the bulk of the removed ash-forming impurities are introduced to a second agitating vessel and agitated in the presence of a body of clean water, preferably cold, such previously formed bodies will materially enlarge, thus producing amalgamated masses of sufficient size to be used as a fuel without further agitation or sizing. For instance, bodies of one-fourth inch (¼″) diameter discharging from the purifying amalgamator may be subjected to this secondary treatment and increased to one inch (1″) in diameter or larger. The size of the finished product is subject to a wide range of variations depending upon the use to which this product is to be put, and the foregoing example is only given as an illustration.

In the accompanying drawing I have shown in Figure 1 in vertical longitudinal section a form of apparatus capable of supporting this process; and Figure 2 represents in vertical longitudinal section an apparatus wherein the amalgamated bodies are subjected to a further treatment for the purpose of enlarging the sizes thereof.

Referring now more particularly to the drawing wherein like reference characters indicate corresponding parts, the numeral 1 designates a purifying and amalgamating vessel. This vessel may be five feet (5) wide, seven feet (7) deep and fourteen feet (14) in length. Passing longitudinally through the vessel is a shaft 2 rotated by any suitable source of power. The vessel is divided by upwardly extending partitions 3 and depending vertical partitions 4 into a series of compartments. In each compartment an agitator blade 5 is mounted on the shaft 2 for the purpose of rapidly agitating the material passing through the amalgamator. A supply of water with pulverized coal is introduced to the amalgamator through the line 5′. A line 6 is provided for the introduction of steam to the amalgamator to heat the contents of the same, and a supply of oil is introduced through the line 7. These lines are all controlled by independently operable valves 8. The discharge end of the amalgamator has an outlet trough 10 for depositing the material on a screen 11 by means of which the amalgamated bodies are separated from the water and ash-forming impurities and may be deposited in a receiver 12 or led directly to a second amalgamator as shown in Figure 2, the operation of which will be hereinafter described. The water with the suspended ash-forming impurities flows through the screen 11 into the trough 17 and then through the pipe 18 to a settling tank 19, or may be allowed to escape if this is desired. In the settling tank 19, the ash-forming substances collect in the bottom of the receptacle, and the water may then be again used in the treating apparatus.

While the amalgamated masses are traveling on the screen 11, I preferably subject them to the action of a cleaning spray by directing jets of water from a perforated pipe 20 upwardly through the screen and into contact with the amalgamated masses. This serves to wash away impurities which may have become attached to the surfaces of the masses. I likewise direct a water spray downwardly through the underside of the screen 11 for the purpose of cleaning the screen of any substances which may be contained thereon so that a clean surface is presented when the screen moves to a position to receive the discharging amalgam.

The coal to be purified is preferably reduced to a very fine state of subdivision, say from 100 to 200 meshes per linear inch. When so reduced, the carbon content of the coal is largely detached from the ash. Water and coal are continuously conveyed to the amalgamator through the line 5'. An agglomerating or amalgamating agent, such as oil, is also introduced to the amalgamator through the line 7. To produce amalgamated bodies of one-fourth inch (¼") diameter, I preferably introduce to the amalgamator two parts by weight of water to one part coal. At the beginning of an operation in order to accelerate the reaction, one part water to one part coal is introduced to the amalgamator, but as soon as a substantial number of bodies are formed I increase the quantity of water to a normal running condition of two parts or more of water to one part coal. When using a heavy fuel oil to form amalgamated bodies, I preferably heat the liquid bath to a temperature of say 120° F. It will be understood that the temperature will vary materially, depending upon the viscosity of the oil used and the sizes of the vodies that are to be formed. The agitator shaft under the conditions of treatment herein specified is preferably rotated at 150 R. P. M.

Intense or rapid agitation not only causes the amalgamation of coal and oil, but produces a multitude of independent, dense bodies rather than a large buttery mass which is produced when the materials are agitated slowly. Consequently, the agitation to carry out this process must be a rapid one in order that the individual bodies be continously produced.

I have discovered that in amalgamating materials continuously by the herein described process a large percentage of the bodies form in the first amalgamating compartment A. The exact percentage I do not know, but from observation I would say that from 30 to 40% of the coal and oil are amalgamated in this compartment, these bodies, together with the unamalgamated coal and oil passing on through the successive compartments. When the amalgamated bodies reach a normal predetermined size of say one-fourth inch (¼") diameter, they generally pass through the succeeding compartments without undergoing substantial enlargement. Obviously the loose carbon particles and oil continue amalgamating as they pass through the successive compartments B, C, and D, etc., of the amalgamator so that practically all of the coal and oil has undergone amalgamation before the final compartment is reached and thence the plastic bodies of a substantially uniform size and from which ash and water are excluded are discharged from the amalgamator.

By controlling the rate of agitation, the temperature of the bath and the water dilution, I am enabled to accomplish the amalgamation of many coals that ordinarily will not yield to amalgamation, to regulate the size of the amalgamated bodies being formed, and to maintain conditions in the amalgamator that will prevent the undue growth of such bodies during fluctuations in the operation such as will occur in a plant of commercial size.

If during an operation it is discovered that the amalgamated bodies are materially increasing in size and in fact becoming so large that they no longer are carried in suspension in the flowing stream, normal conditions can be restored and maintained by varying or increasing the water dilution and reducing the temperature of the bath, which may be accomplished by regulating or cutting off the steam. The rate of agitation need not be changed to effect this change in operating conditions. For instance, a lowering of the temperature of the bath with an increase in the water dilution will result in the formation of bodies of a reduced size. Should an operator, therefore, observe that the amalgamated bodies are unduly increasing in size, it is only necessary that he vary the temperature of the bath and the water dilution until bodies are formed of a predetermined desired size and having once restored the operation to this normal condition, it may be maintained by the required control of temperature and water dilution. This enables the production of amalgamated bodies of a size capable of being carried out and discharged in suspension in a body of water. The formation of unduly large sized bodies is accordingly prevented, it being apparent that if the bodies do become unduly large they will sink in the amalgamator, rapidly accumulating therein which will necessitate the cleaning of the plant in a short period of time.

One of the principal uses of amalgam is to mold or briquette same and to then bake the agglomerates into a hard or solid state. It is desirable to form large amalgamated bodies direct by agitation and to avoid the step of briquetting. To accomplish this, the amalgamated bodies of one-fourth inch (¼″) diameter may be removed from the receiver 12 and introduced to a second amalgamator 14 having compartments 15 therein and an agitator 16. To this amalgamator clean cold water is introduced in a quantity approximating two parts water to one part amalgamated fuel. By passage through this under such conditions the amalgamated bodies coalesce to a certain extent forming masses one inch in diameter or larger, depending upon the agitation and the conditions of treatment. From this second amalgamator the enlarged bodies are discharged upon a screen and then conveyed to a suitable place for storage, or introduced into an oven, not shown, and baked.

Having thus described the invention, what I claim is:

1. A process for purifying carbonaceous fuel, consisting in continuously flowing a body of water through a purifying receptacle, in introducing finely divided fuel to said flowing body, in subjecting such fuel particles to the action of an agent having an affinity for the carbonaceous fuel particles and in sufficient quantity to form with said particles separated amalgamated bodies substantially free of water and noncarbonaceous matter, in maintaining said bodies of a substantially uniform predetermined size and sufficiently small to flow in suspension in said body of water from said purifying receptacle, by controlling the water dilution of the materials, and the temperature of the bath, and in separating the formed bodies from said body of water after discharge from the purifying vessel.

2. A process for purifying carbonaceous fuel consisting in introducing a body of liquid to a purifying vessel to flow therethrough, in introducing finely divided carbonaceous fuel to said body, in subjecting said fuel particles to the action of an agent in sufficient quantity to form with said particles amalgamated bodies substantially free of said liquid and noncarbonaceous matter, in regulating the quantity of liquid introduced to the purifying receptacle and the temperature of said liquid to produce bodies of a predetermined size and to maintain said bodies sufficiently small to flow in suspension in said liquid from said receptacle and in thereafter separating the amalgamated bodies from said liquid.

3. A process for purifying carbonaceous fuel consisting in introducing in predetermined quantities a body of water to a purifying receptacle, in introducing finely divided fuel to said body of water, in subjecting the fuel particles to the action of an agent having an affinity for the carbonaceous fuel particles and in sufficient quantity to form a multitude of bodies of said carbonaceous fuel particles and the agent from which water and non-carbonaceous matter is substantially excluded, in regulating the sizes of said bodies and maintaining said bodies in a substantially uniform predetermined size and sufficiently small to flow freely in suspension in said body of water from said purifying receptacle, and in separating the formed bodies from the stream of water discharging from said receptacle.

4. A process for purifying coal consisting in introducing in predetermined quantities a body of water to a purifying receptacle, in introducing finely divided coal to said body of water, in subjecting the coal particles to the action of an agent having an affinity for the carbonaceous particles thereafter and in sufficient quantity to form a multitude of bodies of said carbonaceous particles and the agent from which water and noncarbonaceous matter is substantially excluded, in regulating the sizes of said bodies and maintaining said bodies in a substantially uniform predetermined size and sufficiently small to flow freely in suspension in said body of water from said purifying receptacle by controlling the conditions prevailing in the purifying receptacle, and in separating the formed bodies from the stream of water discharging from said receptacles.

5. A process of purifying coal consisting in adding to a continuously advancing stream of water containing finely divided coal a relatively large quantity of an agent having a selective affinity for the carbonaceous content of the coal in amounts adapted to agglomerate the carbonaceous content of the coal into a large party mass on prolonged agitation not exceeding approximately 50% of said carbonaceous content, agitating a portion of the said stream adjacent the point of addition of said agent at a rate to cause said carbonaceous content to form with said agent only relatively small plastic amalgamated bodies largely free of water and detached impurities and of a gravity exceeding that of water and prevent union of said amalgamated bodies into a large mass or masses, with the rate of agitation, rate of stream flow, and size of amalgamated bodies such that the bodies are maintained in suspension in the flowing stream and carried thereby from the agitated portion thereof, and in separating said amalgamated bodies from the water and detached impurities after they emerge in suspension in the water from the agitated portion of the stream.

6. A process of purifying coal consisting in adding to a continuously advancing stream of water containing finely divided coal substantially one part of an agent having a selective affinity for the carbonaceous content of the coal to substantially two parts of said carbonaceous content, agitating a portion of the said stream adjacent the point of addition of said agent at a rate to cause said carbonaceous content to form with said agent only relatively small plastic amalgamated bodies largely free of water and detached impurities and of a gravity exceeding that of water and prevent union of said amalgamated bodies into a large mass or masses, with the rate of agitation, rate of stream flow, and size of amalgamated bodies such that the bodies are maintained in suspension in the flowing stream and carried thereby from the agitated portion thereof and in separating said amalgamated bodies from the water and detached impurities after they emerge in suspension in the water from the agitated portion of the stream.

7. A process for continuously separating carbonaceous fuel from noncarbonaceous substances, consisting in flowing a mixture of water and fine carbonaceous fuel through a treating receptacle, in introducing an agent to said receptacle having a selective affinity for the carbonaceous fuel particles, in agitating said substances at a rate sufficient to form a plurality of dense bodies of carbonaceous fuel matter and agent, and in so correlating the water dilution, the rate of agitation and the temperature of the mixture as to maintain said bodies in size sufficiently small to flow freely in suspension in said body of water from the purifying receptacle.

8. A process for continuously separating carbonaceous fuel from noncarbonaceous substances, consisting in flowing a mixture of water and fine carbonaceous fuel through a treating receptacle, in introducing an agent to said receptacle having a selective affinity for the carbonaceous fuel particles, in agitating said substances at a rate sufficient to form a plurality of dense bodies of carbonaceous fuel matter and agent, and in maintaining such bodies in size sufficiently small to flow in suspension in said body of water from the purifying receptacle by regulating the ratio of water relative to the carbonaceous fuel matter introduced to said receptacle.

9. A process for continuously separating carbonaceous fuel from noncarbonaceous substances, consisting in flowing a mixture of water and fine carbonaceous fuel through a treating receptacle, in introducing an agent to said receptacle having a selective affinity for the carbonaceous fuel particles, in agitating said substances at a rate sufficient to form a plurality of dense bodies of carbonaceous fuel matter and agent, and in maintaining such bodies in size sufficiently small to flow in suspension in said body of water from the purifying receptacle by regulating the ratio of water relative to the carbonaceous fuel matter introduced to said receptacle, and the temperature of the materials undergoing treatment.

10. The herein described method consisting in commingling carbonaceous fuel matter in a fine state of subdivision with water, in flowing said commingled substances through an agglomerating receptacle, in introducing an agent to said substances having an affinity for the carbonaceous fuel matter, in subjecting said materials to an agitation characterized by the formation of a plurality of dense, independent bodies of carbonaceous fuel matter and the agent from which water is substantially eliminated, and which bodies remain sufficiently small to flow in suspension in the stream of water from the amalgamating receptacle, and in depositing said bodies upon a pervious support and draining the water therefrom.

11. The herein described method consisting in commingling carbonaceous fuel matter in a fine state of subdivison with water, in flowing said commingled substances through an agglomerating receptacle, in introducing an agent to said substances having an affinity for the carbonaceous fuel matter, in subjecting said materials to an agitation characterized by the formation of a plurality of dense, independent bodies of carbonaceous fuel matter and the agent from which water is substantially eliminated, and which bodies remain sufficiently small to flow in suspension in the stream of water from the amalgamating receptacle, and thereafter subjecting said bodies to a second treatment by injecting them into a clean body of water, in agitating the body during said second treatment to cause material enlargement thereof and in separating the enlarged bodies from the water.

12. A process for purifying coal consisting in introducing a body of liquid to a purifying vessel to flow therethrough, in introducing finely divided carbonaceous fuel to said body, in subjecting said fuel particles to the action of an agent in sufficient quantity to form with said particles amalgamated bodies substantially free of said liquid and noncarbonaceous matter, in regulating the quantity of liquid introduced to the purifying receptacle and the temperature of said liquid to produce bodies of a predetermined size to maintain said bodies sufficiently small to flow in suspension in said liquid from said receptacle and in thereafter separating the amalgamated bodies from said liquid, in thereafter introducing said preformed amalgamated bodies to a second body of water, in agitating the substances to materially increase the size of said bodies, and in separating said enlarged bodies from the water.

13. A process for purifying carbonaceous fuel material comprising adding to a continuously advancing stream of liquid containing finely divided carbonaceous fuel material a quantity of an agent having a selective affinity for the carbonaceous particles thereof, such agent being sufficient in amount to agglomerate said carbonaceous particles into a large pasty mass on prolonged agitation, agitating a portion of the stream to cause said carbonaceous particles to form with said agent only relatively small plastic amalgamated bodies from which at least a substantial part of the non-carbonaceous impurities have been excluded, in maintaining such bodies after formation in sizes sufficiently small to flow freely in suspension in the stream of liquid continuously to a separating zone, separating the amalgamated bodies from the liquid in said zone, re-introducing them to a liquid and further agitating them to produce enlarged amalgam bodies substantially free of fine carbonaceous impurities.

14. A process for purifying carbonaceous fuel material comprising mixing finely divided carbonaceous fuel and a liquid with an agent having a selective affinity for the carbonaceous content of the fuel, in so commingling the agent and the fuel particles as to form only relatively small plastic amalgamated bodies from which at least a substantial part of the non-carbonaceous impurities have been excluded, flowing said bodies in suspension to a separating zone, separating said bodies from the liquid, and then further commingling said bodies with fresh liquid to produce enlarged amalgam bodies substantially free of non-carbonaceous impurities.

15. In a process of purifying carbonaceous material of the character wherein such material in finely divided form is agitated in a body of water in the presence of an agent having an affinity for the carbonaceous particles of said material and wherein said agent is employed in sufficient quantity to form with said particles amalgamated bodies substantially free of the non-carbonaceous content of said material; the improvement which comprises reducing the size of the amalgamated bodies being formed in the process by lowering the temperature and increasing the dilution of said body of water.

16. In a process of purifying carbonaceous material of the character wherein such material in finely divided form is agitated in a body of water in the presence of an agent having an affinity for the carbonaceous particles of said material and wherein said agent is employed in sufficient quantity to form with said particles amalgamated bodies substantially free of the non-carbonaceous content of said material; the improvement which comprises insuring the maintenance of said amalgamated bodies in suspension in the water by lowering the temperature and increasing the dilution of said body of water when the amalgamated bodies are too large to be retained in suspension whereby said bodies are reduced to a size capable of being carried in suspension in the water.

17. A process for purifying carbonaceous fuel material which comprises mixing finely divided carbonaceous fuel and a liquid with an agent having a selective affinity for the carbonaceous content of the fuel thereby forming amalgamated bodies from which a substantial part of the non-carbonaceous impurities of the fuel have been excluded, separating said bodies from said liquid, and then agitating said bodies with fresh liquid to increase the size thereof.

18. A process for purifying carbonaceous fuel material which comprises agitating finely divided carbonaceous fuel in the presence of water with an agent having a selective affinity for the carbonaceous content of the fuel thereby forming amalgamated bodies from which a substantial part of the non-carbonaceous impurities of the fuel have been excluded, separating said bodies from the water, and subjecting the separated bodies to further agitation in the presence of fresh water to increase the size thereof.

19. A process as defined in claim 18 further characterized in that said agent comprises a hydrocarbon oil.

20. A process as defined in claim 18 further characterized in that said fresh water is cold.

21. A process for purifying coal which comprises agitating finely divided coal with oil in the presence of water thereby forming coal-oil agglomerates, separating said agglomerates from the water, and agitating the separated agglomerates in cold fresh water.

22. A process for purifying coals consisting in subjecting pulverized coal in water to the action of a hydrocarbon agglomerating agent, in agitating such materials to combine the carbon content of the coal and the hydrocarbon into amalgamated bodies, in separating such bodies from rejected ash, and in thereafter subjecting such bodies to further agitation in the presence of fresh water to increase the size thereof while eliminating from such bodies additional quantities of ash.

23. A purifying and agitating process for treating fuels, consisting in commingling finely pulverized coal while wet with an agglomerating agent, in agitating such materials to combine the carbon content of the coal with the agglomerating agent, rejecting ash from such agglomerated bodies, in removing the agglomerated bodies and subjecting them to further agitation in the presence of fresh water to cause the combination of said bodies into agglomerates masses of substantially increased diameter and from which masses further ash is rejected, and in separating the finally agglomerated bodies from water and ash.

24. A purifying and agglomerating process for coals comprising subjecting pulverized coal while in water to the action of an agglomerating agent, in agitating said materials to agglomerate the carbon content of the coal and the agglomerating agent and to substantially exclude gangue, in separating such agglomerated bodies from water and rejected ash, in thereafter subjecting said bodies in the presence of fresh water to compression to cause the further agglomeration of said agglomerated masses into aggregates of substantially increased diameter.

25. A purifying and agglomerating process for coals comprising subjecting pulverized coal while in water to the action of an agglomerating agent, in agitating said materials to agglomerate the carbon content of the coal and the agglomerating agent and to substantially exclude gangue, in separating such agglomerated bodies from water and rejected ash, in thereafter subjecting said bodies in the presence of fresh water to compression to cause the further agglomeration of said agglomerated masses into aggregates of substantially increased diameter and to remove additional quantities of gangue from the agglomerated masses to increase the ratio of the oil contained therein.

26. In a process for purifying and agglomerating the carbon content of coal and hydrocarbon oil into plastic masses wherein the coal is subjected while wet to the action of a hydrocarbon oil to cause the carbon content of the coal to combine with the oil into agglomerated masses largely excluding ash and water, the improvement consisting in increasing the size of such agglomerated masses and increasing the ratio of the oil content thereof to the carbon content of the coal by subjecting such masses to a further treatment in the presence of fresh water to cause a series of individual masses to agglomerate into larger aggregates.

In testimony whereof I affix my signature.

WALTER EDWIN TRENT.